(12) United States Patent
Brown et al.

(10) Patent No.: US 11,510,054 B2
(45) Date of Patent: Nov. 22, 2022

(54) METHODS, APPARATUSES, AND COMPUTER PROGRAM PRODUCTS FOR PERFORMING IDENTIFICATION AND AUTHENTICATION BY LINKING MOBILE DEVICE BIOMETRIC CONFIRMATION WITH THIRD-PARTY MOBILE DEVICE ACCOUNT ASSOCIATION

(71) Applicant: Averon US, Inc., Henderson, NV (US)

(72) Inventors: Wendell Brown, Henderson, NV (US); Mark Klein, Henderson, NV (US); Tom Green, Henderson, NV (US)

(73) Assignee: Averon US, Inc., Henderson, NV (US)

( * ) Notice: Subject to any disclaimer, the term of this patent is extended or adjusted under 35 U.S.C. 154(b) by 110 days.

(21) Appl. No.: 16/551,460

(22) Filed: Aug. 26, 2019

(65) Prior Publication Data

US 2020/0068399 A1 Feb. 27, 2020

Related U.S. Application Data

(60) Provisional application No. 62/722,235, filed on Aug. 24, 2018.

(51) Int. Cl.
*H04W 12/06* (2021.01)
*H04L 9/32* (2006.01)
(Continued)

(52) U.S. Cl.
CPC .......... *H04W 12/06* (2013.01); *H04L 9/3231* (2013.01); *H04L 9/3236* (2013.01);
(Continued)

(58) Field of Classification Search
None
See application file for complete search history.

(56) References Cited

U.S. PATENT DOCUMENTS 8,532,612 B1 9/2013 Holzhey et al.
10,475,258 B1* 11/2019 Son .................. H04W 4/027
(Continued)

FOREIGN PATENT DOCUMENTS

| EP | 2701362 A1 | 2/2014 |
|---|---|---|
| EP | 3324662 A1 | 5/2018 |
| WO | WO2016/050990 A1 | 4/2016 |

OTHER PUBLICATIONS

Alexandre Alapetite, "Dynamic 2D-barcodes for multi-device Web session migration including mobile phones", Personal and Ubiquitous Computingvolume 14Issue Jan. 1, 2010 pp. 45-52, (Year: 2010).*

(Continued)

*Primary Examiner* — Piotr Poltorak
(74) *Attorney, Agent, or Firm* — Weaver Austin Villeneuve & Sampson LLP

(57) ABSTRACT

Various embodiments of the present disclosure are directed to providing authentication of access while reducing user input and, specifically to a method, apparatus, and computer program product for receiving device identification information from both a secured system indicating devices with authorization and from a third party telecommunications carrier indicating the mobile device account attempting to access a service provider. Embodiments provided include an apparatus configured to receive, from a mobile device, identification information associated with the mobile device. The apparatus further comprises computing an encrypted hash of the identification information and initiating a search of a registry for a matching entry that matches the encrypted hash of the identification. In an instance when an entry matches the encrypted hash of the identification information, the apparatus further comprises prompting the service provider to grant the mobile device access to one or more services provided by the service provider.

12 Claims, 10 Drawing Sheets

(51) Int. Cl.
*H04W 12/08* (2021.01)
*H04L 9/40* (2022.01)

(52) U.S. Cl.
CPC ........ *H04L 9/3247* (2013.01); *H04L 63/0861* (2013.01); *H04L 63/168* (2013.01); *H04L 63/18* (2013.01); *H04W 12/08* (2013.01); *H04L 2463/082* (2013.01)

(56) References Cited

U.S. PATENT DOCUMENTS

| | | | |
|---|---|---|---|
| 2007/0157028 A1* | 7/2007 | Lott | H04L 9/3236 713/182 |
| 2011/0186406 A1 | 7/2011 | Hirson et al. | |
| 2015/0312248 A1 | 10/2015 | Pruthi et al. | |
| 2016/0294821 A1* | 10/2016 | Neuman | H04L 63/0884 |

OTHER PUBLICATIONS

William Stallings, "Cryptography and network security", 2th edition, 1998, ISBN: 0138690170, (Year: 1998).*
Kormann et al., "Risks of the Passport Single Signon Protocol", AT&T Labs—Research, Computer Networks, Elsevier Science Press, vol. 33, p. 51-58, 2000 (Year: 2000).*
PCT International Search Report and Written Opinion dated Oct. 18, 2019 in PCT Application No. PCT/US2019/048164.
PCT International Preliminary Report on Patentability dated Mar. 2, 2021 in PCT Application No. PCT/US2019/048164.

* cited by examiner

METHODS, APPARATUSES, AND COMPUTER PROGRAM PRODUCTS FOR PERFORMING IDENTIFICATION AND AUTHENTICATION BY LINKING MOBILE DEVICE BIOMETRIC CONFIRMATION WITH THIRD-PARTY MOBILE DEVICE ACCOUNT ASSOCIATION

CROSS REFERENCE TO RELATED APPLICATIONS

This application claims priority to U.S. Provisional Application No. 62/722,235, filed Aug. 24, 2018, the entire contents of which are incorporated herein by reference.

TECHNOLOGICAL FIELD

Embodiments described herein generally relate to frictionless two-factor authentication. In particular, embodiments described herein relate to providing authentication of access while reducing user input and, specifically to a method, apparatus, and computer program product for receiving device identification information from both a secured system indicating devices with authorization and from a third party telecommunications carrier indicating the mobile device account attempting to access a service provider.

BACKGROUND

While conventional two-factor authentication does provide some heightened security with regard to standard login processes, it has yet to be widely adopted, in part, due to the inconvenience caused to the user.

In this regard, areas for improving known, existing and/or conventional authentication systems have been identified. Through applied effort, ingenuity, and innovation, solutions to improve such systems have been realized and are described in connection with embodiments of the present invention.

BRIEF SUMMARY

To address these needs, a first aspect of an example embodiment of the present disclosure relates to methods, apparatuses, and computer program products be configured to receive, from a service provider, a request for a session id, the request for the session id being indicative of an attempt to access one or more services provided by the service provider by a mobile device, generate the session id, provide the session id to the service provider, receive, from the mobile device, identification information associated with the mobile device, wherein the identification information comprises the session id and account information provided by a telecommunications carrier associated with the mobile device, compute an encrypted hash of the identification information associated with the mobile device, initiate a search of a registry for a matching entry that matches the encrypted hash of the identification information associated with the mobile device, wherein the registry comprises a plurality of entries comprising an encrypted hash of a registered account and data associated with a user of the registered account, and in an instance when an entry matches the encrypted hash of the identification information, prompt the service provider to grant the mobile device access to one or more services provided by the service provider. In an example embodiment, the account information provided by the telecommunications carrier is a telephone number and the identification information further comprises biometric information of the user of the mobile device. In an example embodiment, the identification information is embedded in an hypertext transfer protocol (HTTP) or hypertext transfer protocol secure (HTTPS) request transmitted from the mobile device by way of the telecommunications carrier associated with the mobile device.

In yet another example embodiment, methods, apparatuses, and computer program products are configured to prompt the service provider to grant the mobile device access to the one or more services provided by the service provider over an out-of-band channel. In another example embodiment, example embodiment, methods, apparatuses, and computer program products are configured to digitally sign a message comprising the identification information associated with the mobile device using a private key associated with the user of the mobile device.

In an example embodiment, methods, apparatuses, and computer program products are configured to access authentication history of the mobile device, determine if the service provider allows for access to the one or more services without the account information provided by the telecommunications carrier associated with the mobile device, when the service provider allows for access to the one or more services without the account information provided by the telecommunications carrier associated with the mobile device, determine whether the mobile device was previously successfully authenticated within a predetermined period of time, and when it is determined that the mobile device was previously successfully authenticated within the predetermined period of time, prompt the service provider to grant the mobile device access to one or more services provided by the service provider.

BRIEF DESCRIPTION OF THE DRAWINGS

Figure 1:
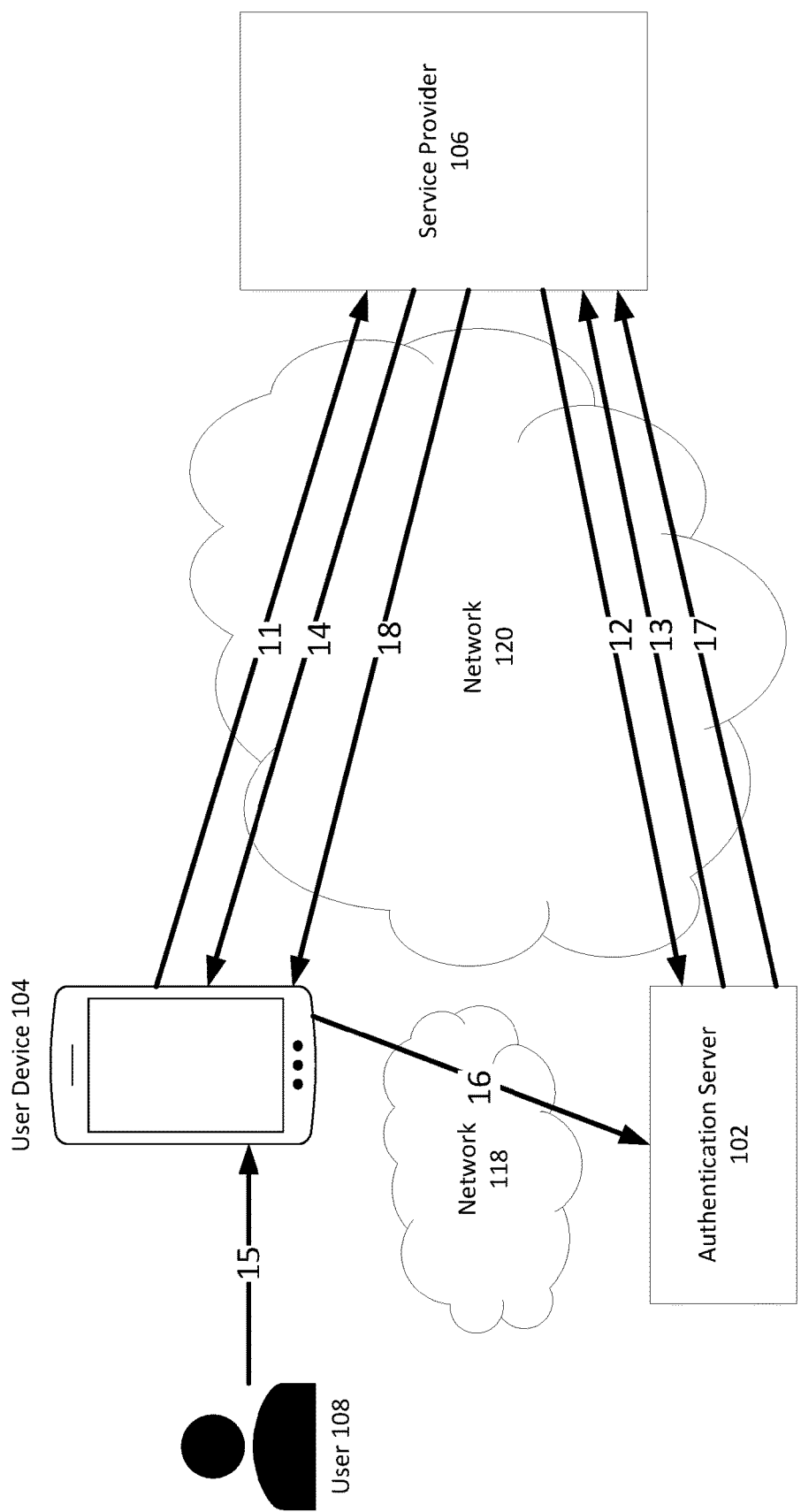
Figure 2:
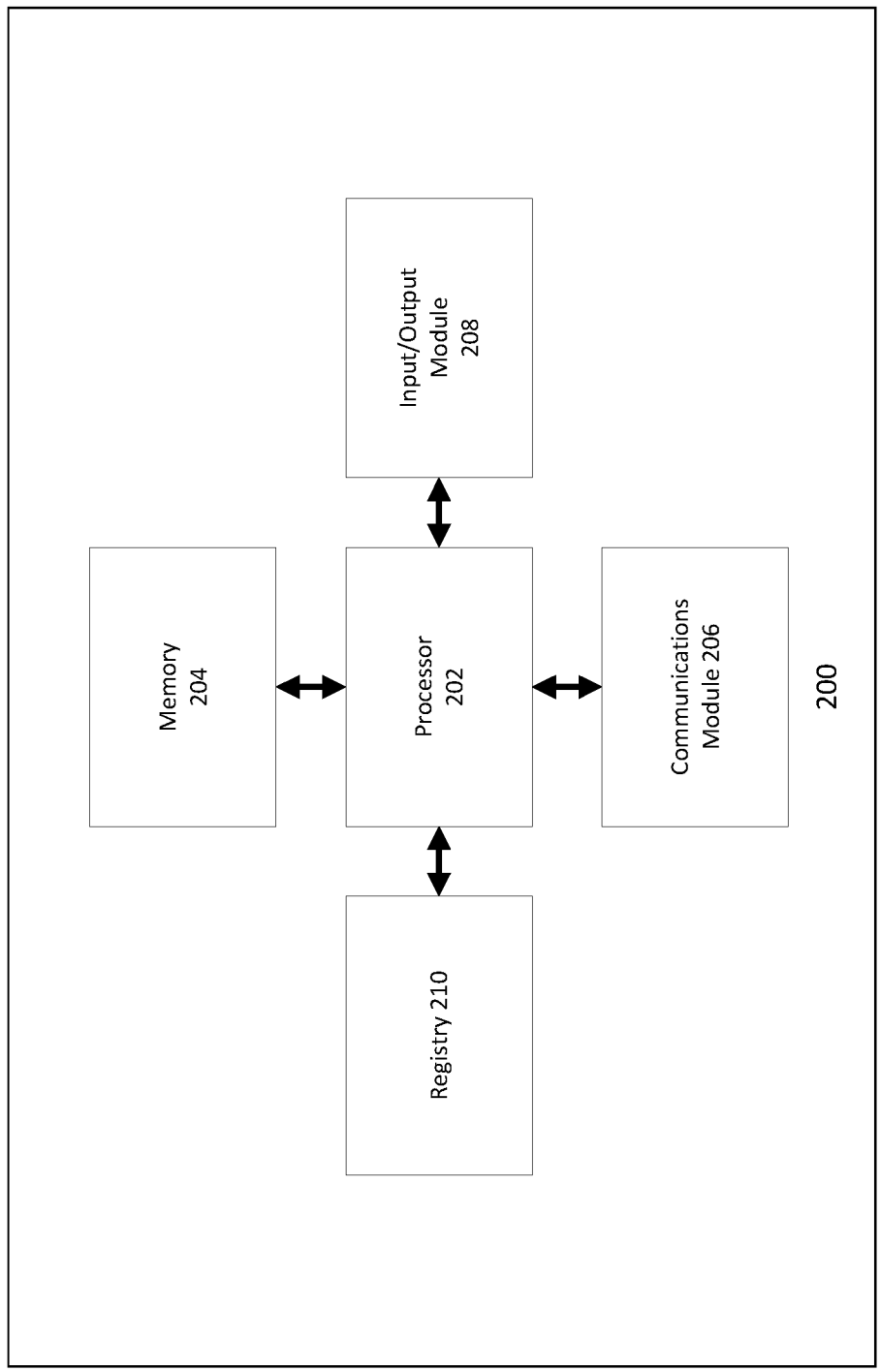
Figure 3:
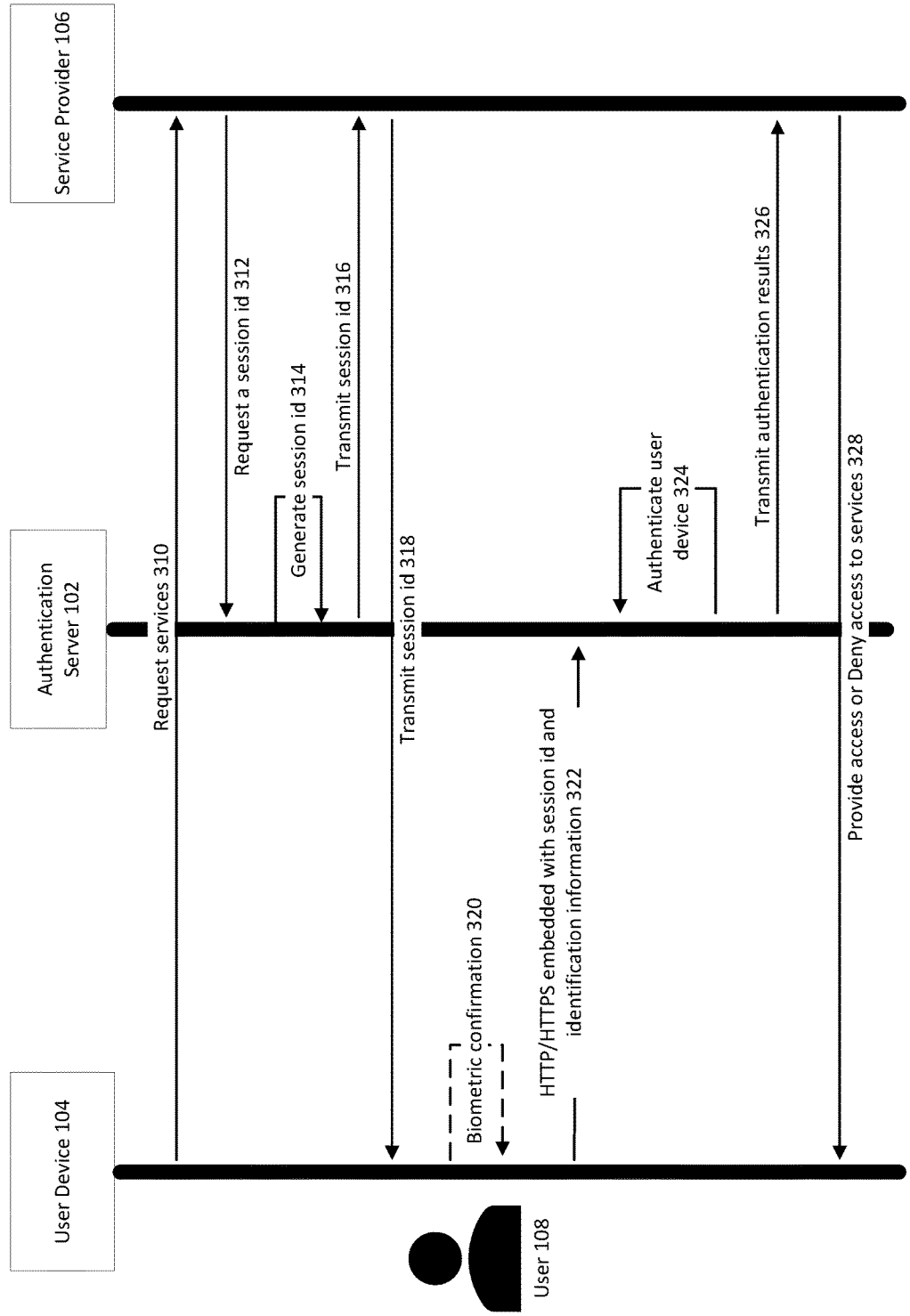
Figure 4:
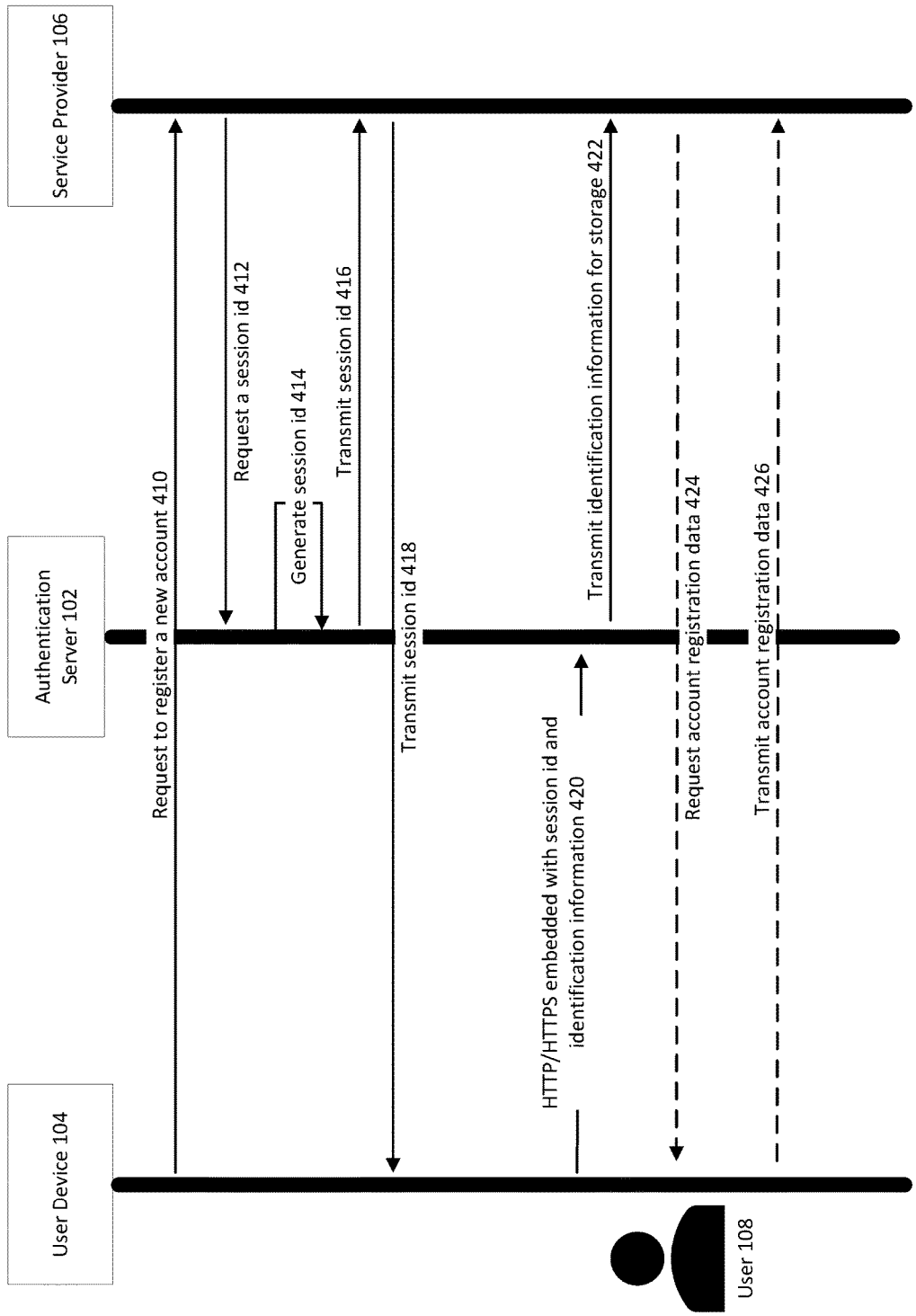

Having thus described embodiments of the invention in general terms, reference will now be made to the accompanying drawings, which are not necessarily drawn to scale, and wherein:

FIG. 1 is a block diagram of a system that may be specifically configured in accordance with an example embodiment of the present invention;

FIG. 2 is a block diagram of an apparatus that may be specifically configured in accordance with an example embodiment of the present invention;

FIGS. 3 and 4 are data flow diagrams, each showing an exemplary operation of an example system in accordance with an embodiment of the present invention; and FIGS. 5-10 depict flowcharts, each showing an exemplary method of operating an example apparatus in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout.

Terms

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

Moreover, the term "exemplary", as may be used herein, is not provided to convey any qualitative assessment, but instead merely to convey an illustration of an example. Thus, use of any such terms should not be taken to limit the spirit and scope of embodiments of the present invention.

The term "service provider" refers to any web service application or a network-connected entity, such as business, merchant, organization, administration, or other provider that provides products and/or services to a user of a mobile device. For example, a service provider may be businesses that provide web servers, web pages, transactional applications to sell products or services, and data to facilitate transactions.

The term "mobile device" refers to computer hardware and/or software that is configured to access a service made available by a service provider. Mobile devices may include, without limitation, smart phones, tablet computers, laptop computers, wearables, personal computers, enterprise computers, and the like. The mobile devices described herein communicate with one or more systems or servers, for example an authentication system via one or more communication network(s).

The term "identification information" as used herein refers to any information that may identify a mobile device, user, or entity. For example, identification information may refer to a session id, account information, and biometric information of a user of the mobile device. Identification information may be stored, transmitted, and/or received, in some embodiments, in a hashed, one-way hashed, encrypted, digitally signed, using public/private key encryption or other means of encrypting, or other similar algorithms (e.g., for system/customer/bank/wireless network/ other privacy or other reasons) data form.

The term "session id" is used herein refers to a unique identifier in the form of a hash generated by a hash function and sent from the authentication system to the service provider and mobile device to identify the current session and a particular request from a mobile device. In an example hypertext transfer protocol (HTTP) or hypertext transfer protocol secure (HTTPS) session, the mobile device stores and sends the session id as an HTTP request to the authentication system as a parameter during the session. In another example embodiment, the HTTP/HTTPS request is embedded with the identification information by way of the telecommunications carrier associated with the mobile device.

The term "account information" as used herein refers to a user's mobile device account information, which may be similar or the same as a mobile device's phone number/ CallerID number, the mobile device's phone number, the mobile device's callerID number, International Mobile Equipment Identity (IMEI)/unique serial number (ICCID) data, network-based, MAC addresses, billing record's modem certificate, DOCSIS hub/Media Access Layer routing assignments, Cable modem's certificate, device serial number, etc., Intel vPro and Trusted Platform Module key, or the like.

The term "biometric information" refers to information indicating a user or human being's physical features, which is used for biometric authentication. Biometric data is used for identifying the user, such as a fingerprint, palm shape, retina, iris, face image, blood image, or the like.

The terms "third party", "telecommunications carrier" or "network provider" as used herein may be, for example, wireless network provider or carrier (e.g., Verizon, AT&T, T-Mobile, etc.) which may have data such as a user's name, billing address, equipment installation address, birthdate, tower routing/router information to the user's wireless device (e.g., mobile phone), IP WAN address, IP LAN address, IP DMZ info, wireless device equipment information (serial number, certificate number, model number, IMEI number etc.), and other information, that it could similarly supply to a third-party.

The term "registry" as used herein, refers to a hash-based access mechanism to protect unfettered access to data associated with the registered account and the user of the registered account. For example, instead of each entry of the registry including a telephone number and/or biometric data stored unencrypted, the entry contains a hashed value of each telephone number and/or biometric data.

The term "registered account" refers to a mobile device that is registered with a telecommunications carrier.

The term "out-of-band channel" refers to utilizing a separate channel, being different from channels associated with telecommunications carriers, used to communicate between the authentication system and service providers for the purpose of secure data transfer or exchange without the involvement of channels associated with telecommunications carriers.

The term "authentication history" refers to data or information stored by the authentication system associated with a particular mobile device, for confirming the identity of the mobile device. In some embodiments, for example, stored authentication information is evaluated to determine whether the mobile device was previously successfully authenticated within a predetermined period of time to verify the mobile device and grant access to one or more services provided by the service provider.

The term "authentication system" refers to computing hardware, circuitry, server, device, system, or sub-system configured to verify the identity of a user associated with a mobile device, or the identity of the mobile device. In some embodiments, the authentication system is configured to receive mobile device identification information. In some embodiments, the authentication system automatically verifies received mobile device identification information. In some embodiments, received mobile device identification information is compared to stored information to determine whether the information matches and in an instance when there is a match, the authentication system is configured to transmit a signal, to prompt the service provider to grant the mobile device access to one or more services provided by the service provider.

The term "header enrichment" refers to a process for authenticating a mobile device or an owner of the mobile device via a Direct Autonomous Authentication process, involving a packet header enrichment in which packet headers comprise device identification information, for example, "injected" therein by a trusted party such as a telecommunications carrier, network provider or through a login process. For example, in some embodiments, a network may inject a phone number associated with a mobile device within packet headers. In this manner, the authentication system may obtain device identification information without user input. application Ser. No. 15/424,595, entitled "Method and Apparatus for Facilitating Frictionless Two-Factor Authentication," filed on Feb. 3, 2017, which is hereby incorporated by reference in its entirety, describes a number of exemplary processes for performing a Direct Autonomous Authentication process.

Overview

Users have specific access rights to service providers, to network systems, or to paid application services. For exercising their access rights, such users need to authenticate themselves. The most known and commonly-used method for user authentication is based on entering a username and a password. This may require a user to manage many different passwords for the service providers, systems, and applications they regularly use, leading to password fatigue, wasted time entering and reentering credentials, and additional time related to reaching out to technology resources to recover and/or reset lost credentials. Additionally, with the growing rate and sophistication of fraud, conventional username and password authentication is not considered safe, since the data can be easily intercepted through the communication network, and then be reused by an attacker for false representation of the original user's identity and rights. Conventional two-factor authentication may help, but is full of friction—a user probably may have their username and password saved, but conventional two-factor authentication requires them to wait for a code and then input the code before having access.

Embodiments of the present disclosure provide the safety of two-factor authentication but require none of the friction of waiting for and subsequently entering the code. Other embodiments combine the process of frictionless two-factor authentication with both a biometric input (e.g., a fingerprint, retinal scan, or the like) and telecommunications carrier provided identification, to authenticate both the mobile device and the user of the mobile device before, for example, allowing access to, for example, a banking service provided by a banking service provider.

In an example embodiment, a user may operate a mobile device to access an authentication system configured for providing frictionless two-factor authentication. In another example embodiment, a service provider may access the authentication system. For example, a service provider receives a request from a mobile device for access to one or more services provided by the service provider. The service provider may then request from the authentication system a session id to be associated with the mobile device request for access. The authentication system generates a session id and provides the session id to the service provider which the service provider transmits to the mobile device. In some embodiments, the authentication system may require biometric information from the user of the mobile device.

In some embodiments, the authentication system receives, from the mobile device, identification information associated with the mobile device comprising the session id and account information provided by a telecommunications carrier associated with the mobile device. The account information may include a telephone number or other unique identifier. The authentication system may then access its registry to verify the session id, account information, and, if included, the biometric information. Once verified, the authentication system may then leverage out-of-band network communications to prompt the service provider to grant the mobile device access to one or more services provided by the service provider.

System Architecture

FIG. 1 is a system diagram showing an exemplary system, which may include one or more devices and sub-systems that are configured to implement embodiments discussed herein. Turning to the FIG. 1, the system may include a user 108, user device 104, service provider 106, and authentication server 102. Authentication server 102, user device 104, and service provider 106, may include any suitable network server and/or other type of processing device to communicate with other devices via one or more networks, such as user device 104, service provider 106, and authentication server 102.

User device 104 may be configured to communicate with service provider 106 over a network, such as network 120, which may be the Internet or the like. The authentication server 102 may be configured to communication with service provider 106 over network 120. User device 104 may be configured to communicate with the authentication server 102 over a network, such as network 118. Network 118 may be the same as network 120. Alternatively, network 120 may be a network out-of-band with respect to network 118, so as to enhance security by preventing device-based and channel-based cyber-attacks.

In some embodiments, authentication server 102 may be configured to generate certificate information, such as a public key and a private key. Authentication server 102 may also be configured to link the generated certificate information to identification information, such as identification information received over network 118 from user device 104. In an example embodiment, authentication server 102 may include, for example, a registry. Authentication server 102 may be configured to store public certificate information, such as, for example, public key(s), certificate validation information, and the like, in the registry. In some embodiments, the registry may additionally store user information, such as a biometric information, name, birthday, and the like, associated with identification information. Authentication server 102 may be configured to store private certificate information, such as a private key, in the registry.

In some embodiments, the components illustrated and described above may be configured to implement multiple operations in accordance with example embodiments of the present invention. For example, the authentication server may be configured to receive a request for a session id from service provider 106, generate the session id, provide the session id to the service provider, receive identification information from user device 104, compute an encrypted hash of the identification information, initiate a search of a registry for a matching entry that matches the encrypted hash of the identification information, and in an instance when an entry matches the encrypted hash of the identification information, prompt the service provider 106 to grant the user device 104 access to one or more services provided by the service provider. In another example embodiment, the user device 104 may be configured to request one or more services from service provider 106, receive a session id from service provider 106, cause transmission of identification information to authentication server 102, and be granted access to the one or more services provided by service provider 106. In yet another example embodiment, for example, the service provider 106 may receive a request for access to one or more services provided by service provider 106 by user device 104, request a session id from the authentication server 102, receive the session id from the authentication server 102, cause transmission of the session id to the user device 104, and receive instructions from the authentication server 102 to grant access to one or more services to the user device 104. In an example embodiment the session id is stored in the registry of the authentication server 102. Additionally or alternatively, the session id is stored in a database or repository of the service provider.

In some embodiments, the several components may be configured to communicate in the manner illustrated by transmissions 11-18. In some embodiments, the user device 104 may transmit a request 11 to service provider 106 over a network 120. Request 11 may be a request for services, such as to register a new user account, download an app, access an account, issue a payment, or the like. In response to the request, service provider 106 may transmit a request 12 to authentication server 102 over the network 120 for a session id. A response 13 provided by the authentication server 102 may include the requested session id generated by the authentication server 102. The service provider may then transmit the session id 14 to the user device 104. In an example embodiment, the authentication server may request for biometric information 15 from the user 108 of the user device 104. The user device 104 may transmit a response 16 to authentication server 102. The response 16 may include an hypertext transfer protocol (HTTP) or hypertext transfer protocol secure (HTTPS) request transmitted from the mobile device over a network 118. In an example embodiment, network 118 may be a telecommunications carrier network. Identification information may be embedded in the HTTP/HTTPS request. The identification information comprises account information provided by the telecommunications carrier and biometric information of the user 108. By associating the session id with the telecommunications carrier provided account information, the authentication server 102 confirms the association between the user device 104 and the user's carrier account. In an example embodiment, this association, in the form of a mobile phone number or other identifying information, is sent to the service provider 116 as depicted in 17. Based on authentication result obtained by the authentication server 102, the service provider 116 provides or blocks access to the requested services. In an example embodiment, the network 120 may be an out-of-band network with respect to network 118, for example network 120 may be an Internet network and network 118 may be a carrier network. In such an embodiment, facilitating transmission 17 over an out-of-band network prevents device-based and channel-based cyber-attacks. In some embodiments, network 118 and network 120 may be partially or entirely the same network.

As mentioned above, transmission 16 may comprise identification information, such as, for example, the session id and account information. The account information may include a mobile phone number associated with user device 104. The identification information may further include biometric information of the user 108 of the user device 104. In some embodiments, transmission 16 may have account information added to it by a third-party after the user device begins the transmission, such as by a telecommunications mobile carrier using header enrichment.

In some embodiments, service provider 106 may be configured to, in response to receiving transmission 11, transmit a certificate request to authentication server 102. In some embodiments, the certificate request may request certificate information associated with user device 104 from authentication server 102. In response to receiving the certificate request, the authentication server 102 may be configured to prepare certificate information, such as public certificate information including a public key, for transmission to service provider 106.

Authentication server 102 may be embodied by one or more computing systems, such as apparatus 200 shown in FIG. 2. As illustrated in FIG. 2, the apparatus 200 may include a processor 202, a memory 204, a communications module 206, input/output module 208, and a registry 210. The apparatus 200 may be configured to execute the operations described above with respect to FIG. 1, and below with respect to FIGS. 3-10. Although these components 202-210 are described with respect to functional limitations, it should be understood that particular implementations necessarily include the use of particular hardware. It should also be understood that certain of these components 202-210 may include similar or common hardware. For example, two sets of circuitry may both leverage use of the same processor, network interface, storage medium, or the like to perform their associated functions, such that duplicate hardware is not required for each module. The use of the term "module" as used herein with respect to components of the apparatus should therefore be understood to include particular hardware configured to perform the functions associated with the particular module as described herein.

The term "module" should be understood broadly to include hardware and, in some embodiments, software for configuring the hardware. For example, in some embodiments, "module" may include processing circuitry, storage medium, network interfaces, input/output devices, and the like. In some embodiments, other elements of the apparatus 200 may provide or supplement the functionality of a particular module, or particular modules. For example, the processor 202 may provide processing functionality, the memory 204 may provide storage functionality, the communications module 206 may provide network interface functionality, and the like.

In some embodiments, the processor 202 (and/or co-processor and any other processing module assisting or otherwise associated with the processor) may be in communications with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be enabled in a number of different ways and may, for example, include one or more processing devices configured to perform independently. Additionally or alternatively, the processor may include one or more processors configured in tandem with a bus to enable independent execution of instructions, pipelining, and/or multithreading. The use of the term "processing module" may be understood to include a single core processor, a multi-core processor, multiple processors internal to the apparatus, and/or remote or "cloud" processors.

In an example embodiment, the processor 20 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in the circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output module 208 that may, in turn, be in communication with processor 202 to provide output to the user and, in some embodiments, to receive an indication of a user input. The input/output module 208 may comprise a user interface and may include a display and may comprise a web user interface, a mobile application, a client device, a kiosk, or the like. In some embodiments, the input/output module 208 may also include a keyboard, a mouse, a touch screen, touch areas, soft keys, a microphone, a speaker, or other input/output mechanisms. The processor and/or user interface module comprising the processor may be configured to control one or more functions of one or more user interface elements through computer program instructions (e.g., software and/or firmware) stored on a memory accessible to the processor (e.g., memory 204, and/or the like).

The communications module 206 may be any means such as a device or circuitry embodied in either hardware or a combination of hardware and software that is configured to receive and/or transmit data from/to a network and/or any other device, circuitry, or module in communication with the apparatus 200. In regard, the communications module 206 may include, for example, a network interface for enabling communications with a wired or wireless communication network. For example, the communication module may include one or more network interface cards, antennae, buses, switches, routers, modems, and supporting hardware and/or software, or any other device suitable for enabling communications via a network. Additionally or alternatively, the communications interface may include the circuitry for interacting with the antenna(s) to cause transmission of signals via the antenna(s) or to handle receipt of signals received via the antenna(s).

Registry 210 includes hardware and software configured to facilitate storage of a registered account and data associated with a user of the registered account. In an example embodiment, registry 210 further facilitates storage of public certificate information linked to the registered account and data associated with a user of the registered account. Additionally or alternatively, registry 210 may be configured to store additional information, such as a session id associated with the user device 104, linked to identification information. Registry 210 may receive information via a network interface provided by the communications module 206. However, it should also be appreciated that, in some embodiments, the registry 210 may include a separate processor, specially configured field programmable gate array (FPA), or application specific interface circuit (ASIC) to perform the reception of information to be stored in the registry 210. Registry 210 is therefore implemented using hardware components of the apparatus configured by either hardware or software for implementing these planned functions.

Registry 210 further includes hardware and software configured to facilitate storage, safeguarding, and management of digital keys linked to the registered account. Additionally or alternatively, registry 210 may be configured to store a private key linked to a registered account. In some embodiments, registry 210 is configured to facilitate storage of identity verification documents, images of identity verification documents, and/or other files representing identity verification documents. Documents and/or files may be stored in the registry 210 linked to the registered account. Additionally or alternatively, registry 210 may be configured to add, delete, or release stored identity verification documents, images of identity verification documents, and/or other files representing identity verification documents to third-parties. As will be appreciated, any such computer program instructions and/or other type of code may be loaded onto a computer, processor, or other programmable apparatus' circuitry to produce a machine, such that the computer, processor other programmable circuitry that execute the code on the machine created the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Operations for Implementing Embodiments of the Present Invention

Having thus described an example system and example apparatuses, an example data flow will now be described. It will be appreciated that the described data flows, operations and/or, processes therein, and the like, are non-limiting examples, and embodiments may perform various data flows, processes, and/or operations in a myriad of ways using various system configurations.

Operations for Authenticating Users With the Authentication Server

FIG. 3 depicts an example data flow illustrating interactions between a user device 104, an authentication server 102, and service provider 106. The data flow 300 illustrates how electronic information may be passed among various systems in accordance with embodiments of the present invention. In particular, FIG. 3 depicts data flow operations for an authentication process, the authentication process comprising receiving, on an authentication server 102, identification information, and based on the identification information, prompting a service provider 106 to provide access or deny access to one or more services provided by the service provider 106.

At step 310, user device 104 requests services, for example in some embodiments, launches an app, attempting to access services provided by service provider 106. The service provider, requiring authentication, then at step 312 requests authentication of the user device by requesting a session id from authentication server 102, the request for the session id prompted by the reception of the attempt to access services provided by the service provider from the user device 104, an app running on the user device 104, or the like. In some embodiments, the attempt to access the services provided by the service provider is received on the app running on the user device 104 and, subsequently, either the app or a remote server operated or otherwise under control of the service provider provides the request for the session id. In step 314, the authentication server 102 generates the session id. The authentication server transmits the session id to the service provider 106 as depicted in step 316. Additionally or alternatively, the session id may be generated by another system, such as the service provider 106. The session id is then transmitted to the user device 104 as shown in step 318. At step 320, the authentication server may request, or provider a request for, biometric confirmation or biometric information from user 108. For example, the service provider 106, or in some embodiments, the authentication server, may request and receive user biometric data from the user device 104. It should be appreciated that the user biometric data may be any of a myriad of biometrics associated with a user 108, for example and without limitation, fingerprint data, face scan data, iris scan data, walking gait data, passcode data, pass pattern data, voice data, and/or the like. Additionally or alternatively, in some embodiments, the user device 104 may capture, retrieve, and/or transmit the device user biometric data in real-time, for example using one or more hardware components associated with a client device (e.g., a fingerprint scanner, face scanner, microphone, and/or the like). In some embodiments, the user biometric data may be encrypted, hashed, and/or otherwise transformed from a raw format such that user privacy associated with the device user biometric data is enhanced.

At step 322, the user device 104 transmits an authorization request having the session id embedded in the request, through HTTP/HTTPS to the authentication server 102. The request may further include, for example, a phone number associated with the user device injected by a telecommunications carrier associated with the user device 104. In this manner, the authentication server 102 or in some embodiments, the service provider 106, may obtain identification information without user input. Since the user device 104 is likely secured such that only the rightful user of a mobile device associated with a mobile phone number may access it, the authentication server may be sure that when a request is made over a device associated with that mobile phone number, it is truly from the user. Thus, the phone number functions as identification information because it serves as a proxy for the user identity itself.

At step 324, the authentication server 102 may be configured to authenticate the user identity and user device 104 using one or more authentication processes. For example, in some embodiments, the apparatus 200A may be configured to perform one or more of the processes described with respect to FIGS. 5-9. Authentication results are transmitted by the authentication server 102 to service provider 106 as shown in step 326. Thereafter, the service provider may provide access or deny access to services based on the authentication results as depicted in step 328.

Operations for Registering Users Using Identification Information

FIG. 4 depicts an example data flow illustrating interactions between a user device 104, an authentication server 102, and service provider 106 for a registration process, the registration process comprising receiving, on an authentication server 102, identification information, linking certificate information with identification information associated with a user device 304, and transmitting the identification information to a service provider 106, such as for storage associated with a user account.

At 410, user device 104 requests to register a new account with service provider 106. The service provider, at step 412 requests a session id from authentication server 102. Steps 410-418 may be substantially similar or the same as described above with respect to steps 310-318, and as such, each of the embodiments described above apply here. In step 414, the authentication server 102 generates the session id. The authentication server transmits the session id to the service provider 106 as depicted in step 416. Additionally or alternatively, the session id may be generated by another system, such as the service provider 106. The session id is then transmitted to the user device 104 as shown in step 418.

At step 420, the user device 104 transmits identification information and the session embedded in an HTTP/HTTPS request. In some embodiments, the identification information may include a phone number in plain-text, a phone number in hashed form, a device-linked identifier, a credit card number, or the like. In some embodiments, the identification information may comprise additional information useful for identifying the user or preparing data, such as a name or other identifying information, or the like. In some embodiments, information associated with a user device that functions as a proxy for identification of the user entity associated with the user device. In some embodiments, the identification information is identity-linked device information that is injected into a transmission from a user device to the authentication system by a carrier device associated with a carrier network, or another trusted third-party device or system.

In an example embodiment, the authentication server 102 may search for or query, for example, a database associated with, under control of, or contained within an authentication system (e.g., that also contains authentication server 102), for information linked with the identification information. In some embodiments, the authentication server 102 may query a registry for public certificate information linked with the identification information. In some embodiments, such as when a user signs up for a new account with a service provider 106 or when the user adds enhanced authentication to an existing account with a service provider 106, the authentication server 102 may not have previously linked information with the identification information, and thus may then, receive result data indicative that the authentication server 102 does not contain information linked to the identification information. Accordingly, in some embodiments, the authentication server 102 may then cause certificate information to be linked to the identification information.

In some embodiments, the certificate information comprises at least a public key and a private key. Additionally or alternatively, the certificate information may comprise public certificate information, including a public key, and/or private certificate information, including a private key. In some embodiments, the private key and public key should be configured such that messages encrypted using one of the keys may be decrypted using the other key. In some embodiments, a user certificate system may be configured to generate certificate information linked to the identification information.

At step 422, the authentication server 102 may be configured to transmit the identification information and public certificate information for storage on the service provider 106. In some embodiments, the authentication server 102 stores the public certificate information in the registry associated with the identification information such that the public certificate information may be retrieved from the registry using the identification information.

Optionally, at step 424, the service provider 106 may be configured to request account registration data, such as, name, password, email, communication preferences, location information, and the like. This information can be added to the identification information. At step 426, the user device 104 may transmit the requested account registration data.

Example Authentication Server Performed Authentication Processes

Figure 5:
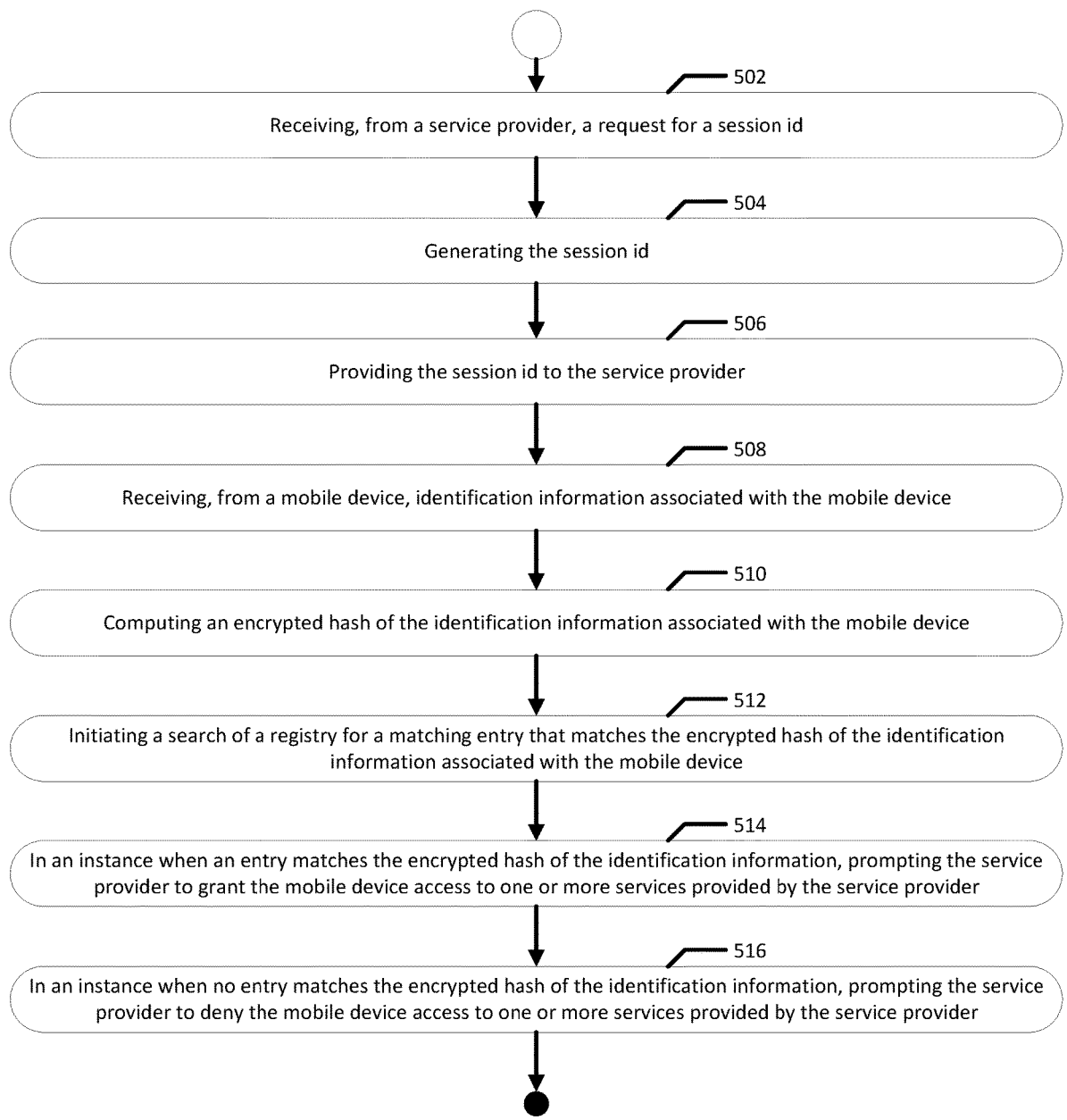

Turning now to FIG. 5, which illustrates a set of operations performed by authentication server 102 in accordance with an exemplary embodiment of the present invention. At block 502, the authentication server 102 receives, from a service provider, a request for a session id. In some embodiments, the request for a session id is in response to a mobile device requesting access to one or more services provided by the service provider. In some embodiments, the request for the session id is indicative of and/or comprises information indicating an attempt to access the service provider and/or one or more services provided by the service provider by a mobile device. At block 504, the authentication server 102 generates the session id. In some embodiments, the authentication server 102 authorizes, instructs, or otherwise causes a different service or device to generate the session id. In some embodiments, the session id may be a random number "09242019." In block 506, the authentication server may provide the session id to the service provider. In some embodiments, the authentication server 102 may authorize, instruct, or otherwise cause the session id to be provided to the service provider At block 508, the authentication server may receive, for example directly, or indirectly, from a mobile device, identification information associated with the mobile device. The identification information may include a phone number in plain-text, a phone number in hashed form, a device-linked identifier, a credit card number, or the like. In some embodiments, the identification information may comprise additional information useful for identifying the user or preparing data, such as biometric information or other identifying information, or the like. In some embodiments, the identification information may have account information included during the transmission by a third-party, such as a telecommunications carrier using a process such as header enrichment. In some embodiments, the identification information may include a session id, such as a session id generated by the authentication server 102 in an earlier step. In an example embodiment, the account information provided by the telecommunications carrier is a telephone number. In another example embodiment, the identification information further comprises biometric information of the user of the mobile device.

In block 510, the authentication server 102 may compute an encrypted hash of the identification information associated with the mobile device. In block 512, the authentication server 102 may initiate a search of a registry for a matching entry that matches the encrypted hash of the identification information associated with the mobile device. In an example embodiment the registry comprises a plurality of entries comprising an encrypted hash of a registered account and data associated with a user of the registered account. In an instance when an entry matches the encrypted hash of the identification information, the authentication server 102 may prompt the service provider to grant the mobile device access to one or more services provided by the service provider as shown in block 514. Additionally or alternatively, in an instance when no entry matches the encrypted hash of the identification information, the authentication server 102 may prompt the service provider to deny the mobile device access to one or more services provided by the service provider. In an example embodiment, the authentication server 102 may prompt the service provider to allow or deny access via an out-of-band network, for example the network may be an Internet network. In such an embodiment, facilitating such transmission over an out-of-band network prevents device-based and channel-based cyber-attacks. For example, the authentication server 102 may prompt the service provider to grant the mobile device access to the one or more services provided by the service provider over an out-of-band channel.

In some embodiments, in response to receiving the identification information associated with the mobile device, the authentication server 102 may generate a secure message comprising the encrypted hash of the identification information in which a portion of the secure message is encrypted. The authentication server 102 may transmit the encrypted hash of the identification information to the service provider via an out-of-band network. In some embodiments, the authentication sever may encrypt a portion of the secure message using a private key stored in the registry and linked to registered account information of the mobile device. In some embodiments, the identification information received at 508 may include a secret key used to decrypt the private key before using the private key to encrypt the portion of the secure message. Alternatively or additionally, in some embodiments, the identification information received at 508 may include a private key fragment, such that the private key fragment may be combined with the private key to form a complete private key. In such embodiments, the complete private key may then be used to encrypt a portion of the secure message. For example, the authentication server may digitally sign a message comprising the identification information associated with the mobile device using a private key associated with the user of the mobile device.

The secure message may include a time-stamp, a session id, identification information, such as a telephone number in hashed or plain-text form, or the like. Including such additional information in the identity message may enhance security by minimizing the risk of message intercept and subsequent reuse. In an example embodiment, the authentication server 102 transmits the secure message to the service provider. In some embodiments, the authentication server 102 may transmit the secure message and additional information. In some embodiments, for example, the authentication server 102 may transmit a portion of the public certificate information, such as a public key, to the service provider along with the secure message. In such embodiments, the service provider may use the public key to validate the identity message. In another example embodiment, the authentication sever may generate a authentication report. The authentication report may memorialize the transmission of the secure message to the service provider. The authentication report may further provide authentication history of the mobile device. The authentication server 102 may be configured to store the authentication report in the registry. In an example embodiment the authentication report comprising the authentication history is stored in the registry of the authentication server 102. Additionally or alternatively, the authentication report comprising the authentication history is stored in a database or repository of the service provider.

Identification Information Based Authentication

Figure 6:
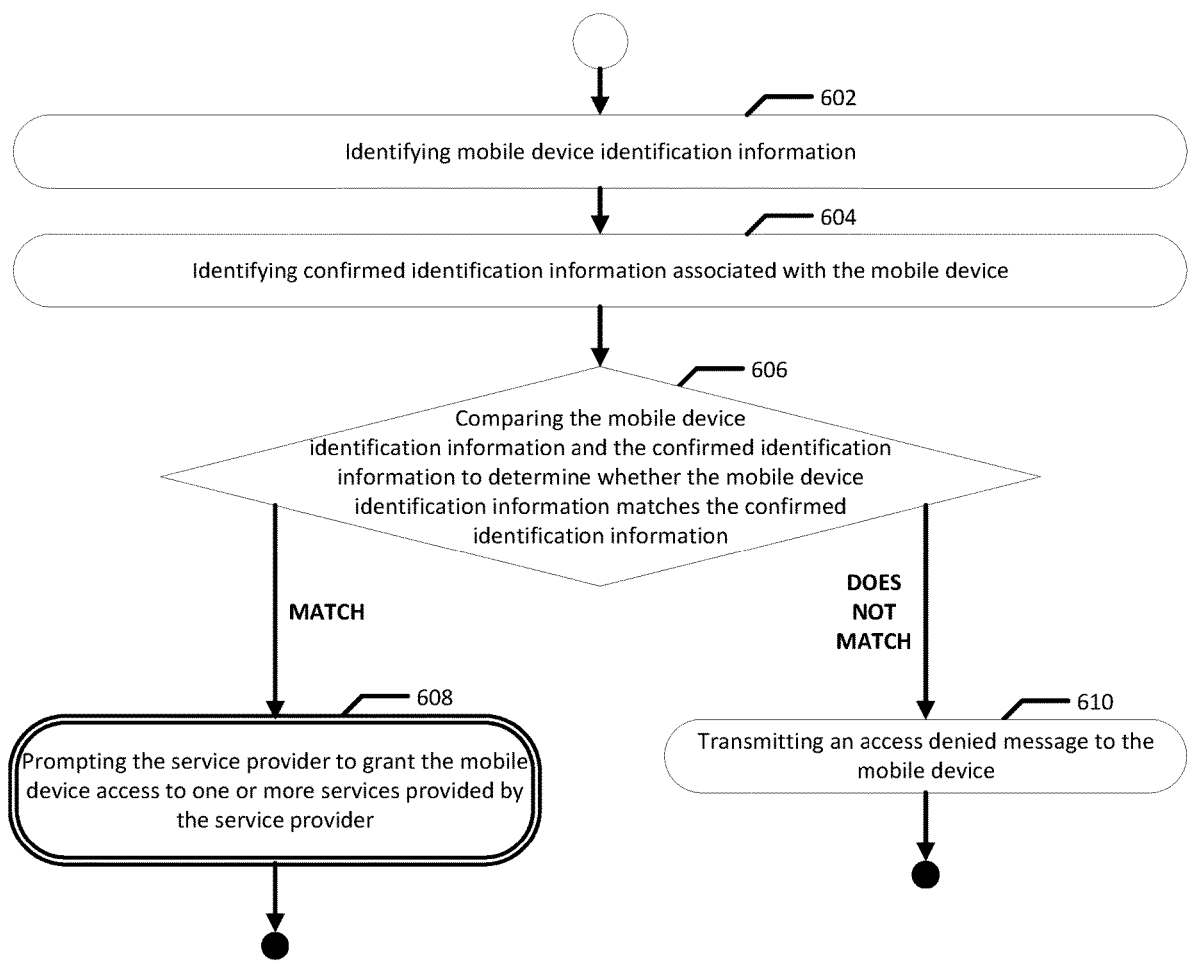

FIG. 6 illustrates one example authentication process that may be used in some embodiments. For example, in some embodiments, the process described with respect to FIG. 6 may embody a sub-process for performance as one authentication process in authentication of a user identity associated with a mobile device, for example at step 324 of the process depicted with respect to FIG. 3. It should be understood that, in some embodiments, the authentication process described with respect to FIG. 6 may be combined with one or more authentication processes with associated operations performed in any combination, order, and/or the like. The example process may provide a specific computer-implemented method to be performed by specially configured hardware and/or software, for example performed by the apparatus 200 shown in FIG. 2.

At block 602, the apparatus 200 includes means, such as processor 202, and/or the like, or a combination thereof, configured to identify device identification information associated with the user device. The identification information, in some embodiments, may be stored by the mobile device, and retrieved for transmission to the apparatus 200.

At block 604, the apparatus 200 includes means, such as processor 202, and/or the like, or a combination thereof, configured to identify confirmed identification information associated with the mobile device. The confirmed identification information may include a phone number in plaintext, and/or a phone number in hashed form. In some embodiments, to identify the confirmed identification information associated with the mobile device, the apparatus 200 is configured to retrieve the confirmed identification information from a registry database. The apparatus 200 may include one or more registry databases configured to store confirmed identification information, for example a dedicated identification information database or a single database configured for storing multiple authentication data types (e.g., confirmed biometric information, stored biometric data, stored authentication history data, and stored proximity data). The confirmed identification information may be retrieved based on the mobile device identification information, for example where the confirmed identification information is stored to a database associated with specific device identification information. In some such embodiments, the apparatus 200 identifies confirmed identification information using one or more database queries. For example, in some embodiments, the apparatus 200 is configured to query a confirmed identification information database using the identified device identification information and/or other information received. The apparatus 200 may, in response to the query, receive result data including the confirmed identification information.

At determination block 606, the apparatus 200 includes means, such as processor 202, and/or the like, or a combination thereof, configured to compare the mobile device identification information and the confirmed identification information to determine whether the mobile device identification information matches the confirmed identification information. In some such embodiments, the apparatus 200 is configured to perform a direct comparison between the mobile device identification information and confirmed mobile device identification information. In other embodiments, the apparatus 200 is configured to perform one or more un-encryption or other transformation operations on the mobile device identification information and/or confirmed mobile device identification information before comparing. Alternatively or additionally, in some embodiments, the apparatus 200 may implement one or more APIs for performing the comparison between the mobile device identification information and the confirmed mobile device identification information. In this example embodiment, the confirmed identification information may be associated with a mobile device registered with a telecommunications carrier.

If, at block 606, the apparatus 200A determines the mobile device identification information does not match the confirmed mobile device identification information, flow continues to block 610. At block 610, the apparatus 200 includes means, such as processor 202, and/or the like, configured to transmit an access denied message to the mobile device. The message may be embodied by, or include, an indication that the mobile device identification information does not match the confirmed mobile device identification information.

If, at block 606, the apparatus 200A determines the mobile device identification information does match the confirmed mobile device identification information, the apparatus 200 may continue processing at block 608. At block 608, the apparatus 200 includes means, such as processor 202, and/or the like, configured to prompt the service provider to grant the mobile device access to one or more services provided by the service provider.

Figure 7:
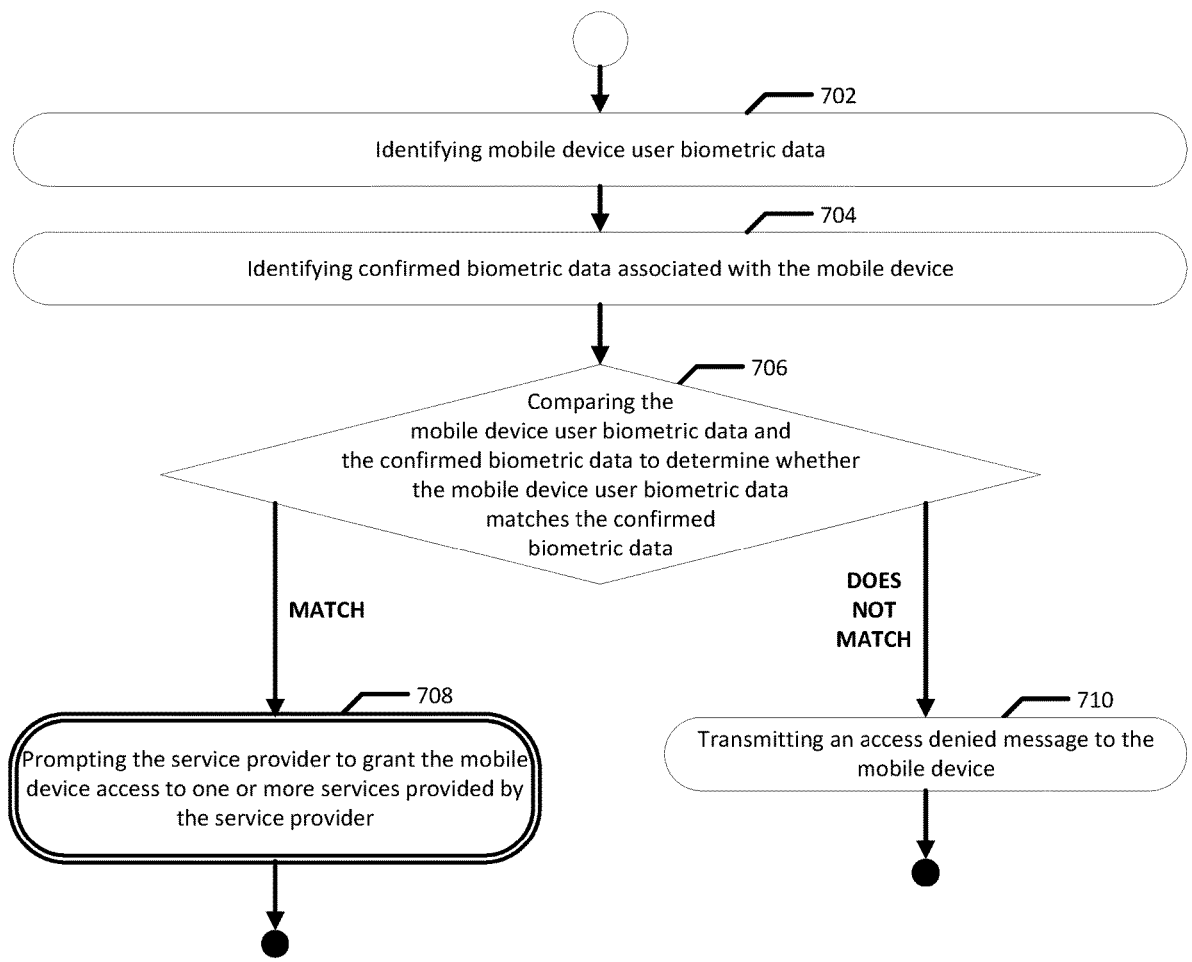

FIG. 7 illustrates yet another example authentication process that may be used in some embodiments. For example, in some embodiments, the process described with respect to FIG. 7 may embody a sub-process for performance as one authentication process in authentication of a user identity associated with a mobile device, for example at block 324 of the process depicted with respect to FIG. 3. It should be understood that, in some embodiments, the authentication process described with respect to FIG. 7 may be combined with one or more authentication processes with associated operations performed in any combination, order, and/or the like. The example process may provide a specific computer-implemented method to be performed by specially configured hardware and/or software, for example performed by the apparatus 200. Application Ser. No. 16/549,662, entitled "Methods, Apparatuses, Computer Program Products for Frictionless Custody Management," filed on Aug. 23, 2019, which is hereby incorporated by reference in its entirety, describes a number of exemplary authentication processes for performing a biometric confirmation authentication process.

At block 702, the apparatus 200 includes means, such as processor 202, and/or the like, configured to identify mobile device user biometric data associated with a mobile device. It should be appreciated that the mobile device user biometric data may be any of a myriad of biometrics associated with a user, for example and without limitation, fingerprint data, face scan data, iris scan data, walking gait data, passcode data, pass pattern data, voice data, and/or the like. Additionally or alternatively, in some embodiments, the apparatus 200 may capture, retrieve, and/or transmit the device user biometric data in real-time, for example using one or more hardware components associated with the client device (e.g., a fingerprint scanner, face scanner, microphone, and/or the like). In some embodiments, the device user biometric data may be encrypted, hashed, and/or otherwise transformed from a raw format such that user privacy associated with the device user biometric data is enhanced.

At block 704, the apparatus 200 includes means, such processor 202, and/or the like, configured to identify confirmed biometric data associated with the mobile device. For example, biometric data associated with a registered mobile device as confirmed via a telephone number associated with a telecommunications carrier. The confirmed biometric data may include data representing one or more biometric features associated with an authenticated, registered user of the mobile device. The confirmed biometric data may be received by the mobile device and/or otherwise provisioned by a user previously. In some embodiments, to identify the confirmed biometric data associated with the mobile device, the apparatus 200 is configured to retrieve the confirmed biometric data from a registry database or other repository. The apparatus 200 may include one or more registry databases configured to store confirmed biometric data, for example a dedicated confirmed biometric database or a single database configured for storing multiple authentication data types (e.g., confirmed biometric data, confirmed identification information, stored authentication history information, and stored proximity data). The confirmed biometric data may be retrieved based on the device identification information, for example where the confirmed biometric data is stored to a database associated with specific device identification information. In some embodiments, the apparatus 200 stores confirmed biometric data associated with particular device identification information based on the device user biometric data. In other embodiments, a user may configure and/or otherwise submit confirmed biometric data to be stored with the device identification information, or the like.

In some such embodiments, the apparatus 200 identifies confirmed biometric data using one or more database queries. For example, in some embodiments, the apparatus 200 is configured to query a confirmed biometric database using the identified device identification information. The apparatus 200 may, in response to the query, receive result data including the confirmed biometric data associated with the device identification information, and therefore associated with the mobile device. At determination block 706, the apparatus 200 includes means, such as processor 202, configured to compare the mobile device user biometric data and the confirmed biometric data to determine whether the mobile device user biometric data matches the confirmed biometric data. In some such embodiments, the apparatus 200 is configured to perform a direct comparison between the mobile device user biometric data and confirmed biometric data. In other embodiments, the apparatus 200 is configured to perform one or more un-encryption or other transformation operations on the mobile device user biometric data and/or confirmed biometric data before comparing. Alternatively or additionally, in some embodiments, the apparatus 200 may implement one or more APIs for performing the comparison between the device user biometric data and the confirmed biometric data. The apparatus 200 may, in some embodiments, implement various comparison algorithms for biometric data of different types (e.g., a first comparison for fingerprint data, a second comparison for voice data, and/or the like).

If, at block 706, the apparatus 200 determines the mobile device user biometric data does not match the confirmed biometric data, flow continues to block 710. At block 710, the apparatus 200 includes means, such as processor 202, configured to transmit a an access denied message to the mobile device. The message may be embodied by, or include, an indication that the mobile device user biometric data does not match the confirmed biometric data. If, at block 606, the apparatus 200 determines the mobile device biometric data matches the confirmed biometric data, the apparatus 200 may continue processing at block 708. At block 708, the apparatus 200 includes means, such as processor 202, configured to prompt the service provider to grant the mobile device access to one or more services provided by the service provider.

Figure 8:
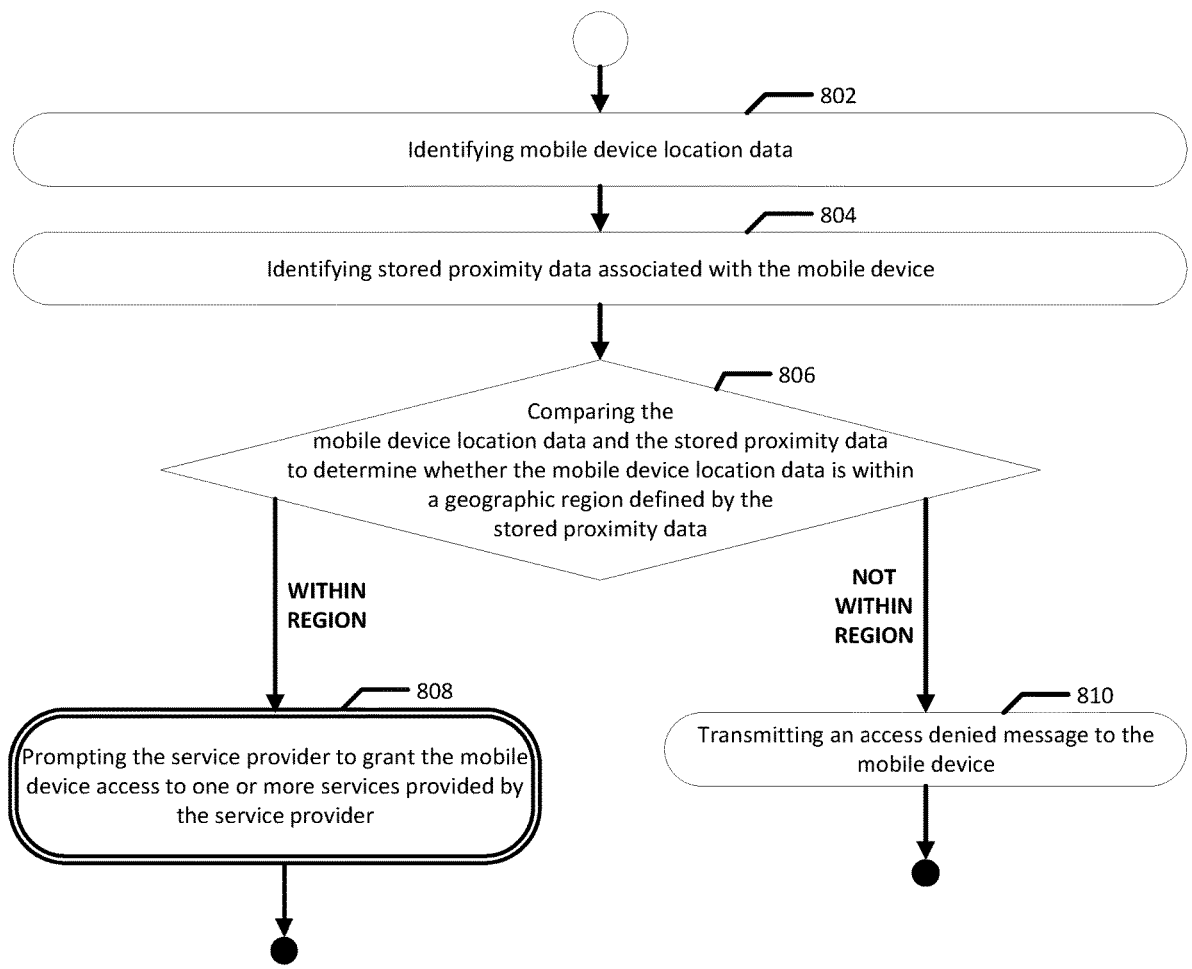

FIG. 8 illustrates yet another example authentication process that may be used in some embodiments. For example, in some embodiments, the process described with respect to FIG. 8 may embody a sub-process for performance as one authentication process in authentication of a user identity associated with a mobile device, for example at block 324 of the process depicted with respect to FIG. 3. It should be understood that, in some embodiments, the authentication process described with respect to FIG. 8 may be combined with one or more authentication processes with associated operations performed in any combination, order, and/or the like. The example process may provide a specific computer-implemented method to be performed by specially configured hardware and/or software, for example performed by the apparatus 200. application Ser. No. 16/549,662, entitled "Methods, Apparatuses, Computer Program Products for Frictionless Custody Management," filed on Aug. 23, 2019, which is hereby incorporated by reference in its entirety, describes a number of exemplary authentication processes for performing a location confirmation authentication process.

At block 802, the apparatus 200 includes means, such as processor 202, configured to identify device location data associated with the mobile device requesting one or more services from the service provider. It should be appreciated that the device location data may be in any of a myriad of formats and embody a myriad of location types, for example, without limitation, a latitude and longitude coordinate, triangulation data from a network provider or another entity associated with the client device, an address, a zip code, a region-identifier determined by the apparatus 200 based on one or more previous actions, and/or the like. The device location data, in some embodiments, may be stored by the client device, and retrieved for transmission to the apparatus 200. Additionally or alternatively, in some embodiments, the apparatus 200 may detect, collect, and/or transmit the device location data in real-time, for example using location services hardware and/or software associated with the client device.

At block 804, the apparatus 200 includes means, such as processor 202, configured to identify stored proximity data associated with the mobile device. The stored proximity data may include data representing one or more geographic areas such that a mobile device is authenticated if device location associated with the mobile device is within one of the geographic areas. For example, in some embodiments, the stored proximity data may include an approved location indicator and a radius, such that the stored proximity data represents a certain radius around the approved location. Alternatively or additionally, in some embodiments, the stored proximity data comprises a plurality of location boundary data objects, such that the stored proximity data represents an enclosed geographic area defined by the plurality of location boundary data objects.

In some embodiments, to identify the stored proximity data associated with the mobile device, the apparatus 200 is configured to retrieve the stored proximity data from a database or other repository. The stored proximity data may be retrieved based on the device identification information, for example where the stored proximity data is stored to a database associated with certain device identification information. In some embodiments, the apparatus 200 generates the stored proximity data associated with particular device identification information based on the device location data. In other embodiments, a user may configure and/or otherwise submit proximity data to be stored associated with the device identification information, or the like. In some such embodiments, the apparatus 200 identifies stored proximity data using one or more database queries. For example, in some embodiments, the apparatus 200 is configured to query a proximity data database using identified device identification information and/or other information received. The apparatus 200 may, in response to the query, receive result data including the stored proximity data associated with the device identification information, and therefore associated with the recipient client device.

At determination block 806, the apparatus 200 includes means, such as processor 202, configured to compare the mobile device location data and the stored proximity data to determine whether the mobile device location data is within a geographic region defined by the stored proximity data. In some embodiments, the apparatus 200 may utilize one or more application programming interfaces (APIs) to compare the device location data and the stored proximity data, wherein such one or more API(s) are configured to output the determination. Alternatively, in some embodiments, the apparatus 200 is configured to perform one or more range checks, for example a range check between the mobile device location data and location data include in the stored proximity data, to output the determination as to whether the mobile device location data satisfies a range threshold included in or associated with the geographic area defined by the stored proximity data (for example, the mobile device location data is within the geographic area if less than the range threshold distance from a particular stored location). It should be appreciated that, in other embodiments, one or more additional and/or alternative algorithms may be used to determine whether the mobile device location data is within the geographic region defined by the stored proximity data.

If, at block 806, the apparatus 200 determines the mobile device location data is not within the geographic region defined by the stored proximity data, flow continues to block 810. At block 810, the apparatus 200 includes means, such as processor 202, configured to transmit an access denied message to the mobile device. The message may be embodied by, or include, an indication that the mobile device location data is not within the geographic region defined by the stored proximity data. Returning to block 806, if, at block 806, the apparatus 200 determines the device location data is within the geographic region defined by the stored proximity data, the apparatus 200 may continue processing at block 808. At block 808, the apparatus includes means, such as processor 202, configured to prompt the service provider to grant the mobile device access to the one or more services provided by the service provider.

Figure 9:
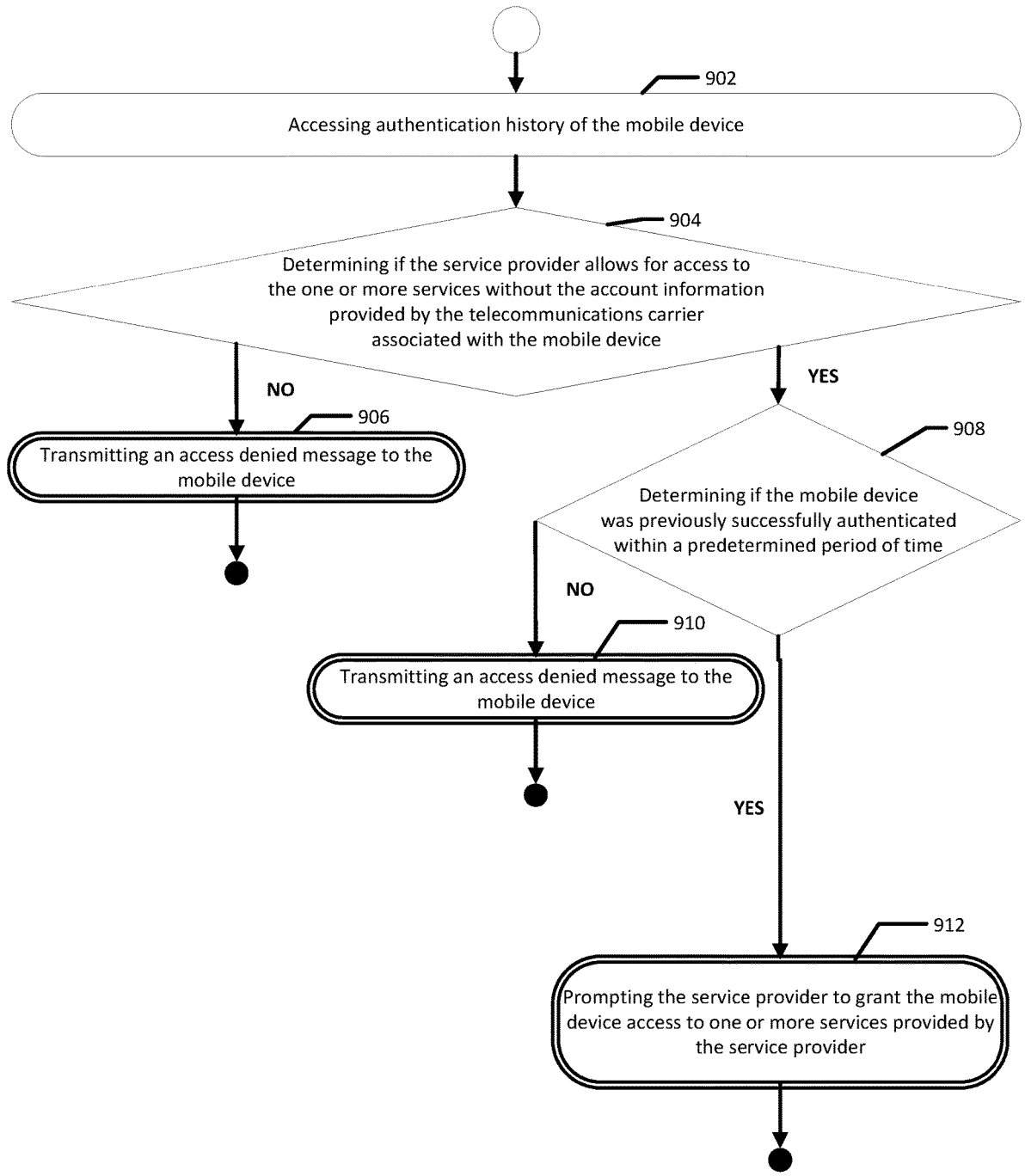

FIG. 9 illustrates yet another example authentication process that may be used in some embodiments. For example, in some embodiments, the process described with respect to FIG. 9 may embody a sub-process for performance as one authentication process in authentication of a user identity associated with a mobile device, for example at block 324 of the process depicted with respect to FIG. 3. It should be understood that, in some embodiments, the authentication process described with respect to FIG. 9 may be combined with one or more authentication processes with associated operations performed in any combination, order, and/or the like. The example process may provide a specific computer-implemented method to be performed by specially configured hardware and/or software, for example performed by the apparatus 200. The authentication process described with respect to FIG. 9 may be utilized in cases when no cellular network service is available.

At block 902, the apparatus 200 includes means, such as processor 202, configured to access authentication history of the mobile device. The authentication history may include data representing one or more geographic areas such that a mobile device is authenticated if previous attempts to authenticate the mobile device were successful. In some embodiments, to access the authentication history data associated with the mobile device, the apparatus 200 is configured to retrieve the stored authentication history data from a database or other repository. The stored authentication history data may be retrieved based on the device identification information, for example where the stored authentication history data is stored to a database associated with certain device identification information. In some embodiments, the apparatus 200 generates the stored authentication history data associated with particular device identification information based on the access attempts. For example, in some embodiments, the apparatus 200 is configured to query a authentication history data database using identified device identification information. The apparatus 200 may, in response to the query, receive result data including the stored authentication history data associated with the device identification information, and therefore associated with the mobile device.

At determination block 904, the apparatus 200 includes means, such as processor 202, configured to determine if the service provider allows access to the one or more services with the account information provided by the telecommunication carrier associated with the mobile device (i.e., without cellular network services, identification information associated with the mobile device may not be retrieved). If, at block 906, the apparatus 200 determines the service provider does not allow access, flow continues to block 906. At block 906, the apparatus 200 includes means, such as processor 202, configured to transmit an access denied message to the mobile device. The message may be embodied by, or include, an indication that the mobile device location data is not within the geographic region defined by the stored proximity data. Returning to block 904, if, at block 904, the apparatus 200 determines the service provider allows access without account information, the apparatus 200 may continue processing at determination block 908. At determination block 908, the apparatus includes means, such as processor 202, configured to determine if the mobile device was previously successfully authenticated within a predetermined period of time. If at block 908, the apparatus 200 determined that the mobile device was not previously authenticated with a predetermined period of time, the apparatus 200 may continue processing at block 910. At block 910, the apparatus 200 includes means, such as processor 202, configured to transmit an access denied message to the mobile device. If at block 908, the apparatus 200 determined that the mobile device was previously authenticated with a predetermined period of time, the apparatus 200 may continue processing at block 912. At block 912, the apparatus 200 includes means, such as processor 202, configured to prompt the service provider to grant the mobile device access to one or more services provided by the service provider.

Example Authentication Server Performed Registration Processes

Figure 10:
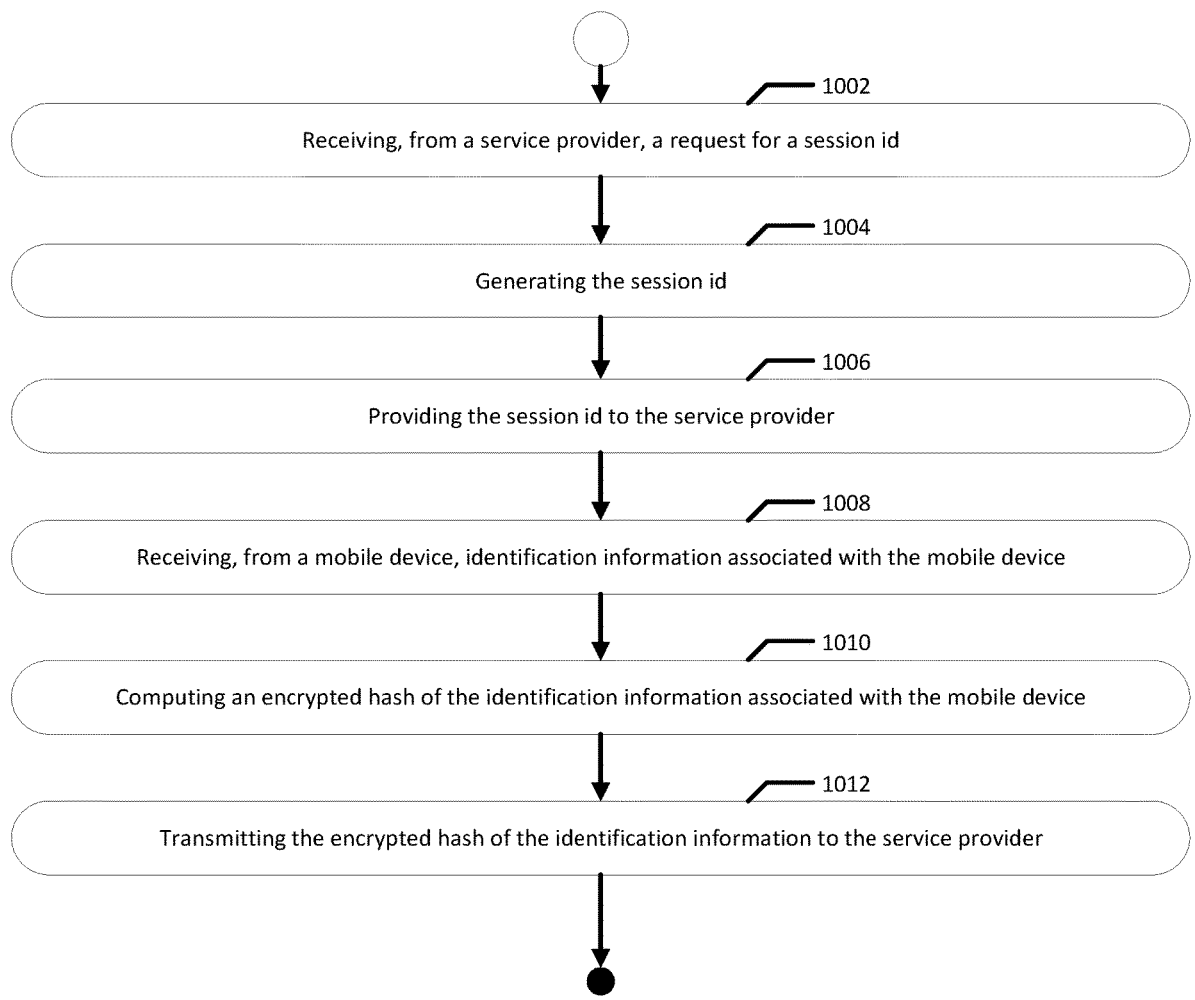

Turning now to FIG. 10, which illustrates a set of operations performed by authentication server 102 in accordance with an exemplary embodiment of the present invention. At block 1002, the authentication server 102 receives, from a service provider, a request for a session id. In some embodiments, the request for a session id is in response to a mobile device requesting to register for access to one or more services provided by the service provider. In the example embodiment, the mobile device is registering for access for the first time. At block 1004, the authentication server 102 generates the session id. In some embodiments, the session id may be a random number or a mix of number and characters. In block 1006, the authentication server may provide the session id to the service provider. At block 1008, the authentication server may receive, from a mobile device, identification information associated with the mobile device. The identification information may include a phone number in plain-text, a phone number in hashed form, a device-linked identifier, a credit card number, or the like. In some embodiments, the identification information may comprise additional information useful for identifying the user or preparing data, such as biometric information or other identifying information, or the like. In some embodiments, the identification information may have account information included during the transmission by a third-party, such as a telecommunications carrier using a process such as header enrichment. In some embodiments, the identification information may include a session id, such as a session id generated by the authentication server 102 in an earlier step.

In block 1010, the authentication server 102 may compute an encrypted hash of the identification information associated with the mobile device. In block 1012, the authentication server 102 may transmit the encrypted hash of the identification information to the service provider. The encrypted hash of the identification information is utilized to establish a registered account associated with the identification information. The registered account is operable to access one or more services provided by the service provider. In an example embodiment, the authentication server 102 may transmit the encrypted hash of the identification information via an out-of-band network, for example the network may be an Internet network. In such an embodiment, facilitating such transmission over an out-of-band network prevents device-based and channel-based cyber-attacks. In another example embodiment, the registered account is established without setting up a username and password. In other embodiments, after establishing the registered account, the service provider may request an associated username and password, which may be used in conjunction with the user's mobile device to access the user's account via authentication processes described herein. In an example embodiment the registered account is stored in the registry of the authentication server 102. Additionally or alternatively, the registered account is stored in the a database or repository of the service provider.

Use Cases

In an example embodiment of the present invention, an apparatus or computer program product may be provided to implement or execute a method, process, or algorithm for facilitating frictionless authentication in the attempted access to one or more services provided by a service provider.

Here, the user, for example, operating a user device with a mobile app installed thereon with a particular purpose (e.g., accessing security system such as the lock on their car) opens the app, which may or may not require login credentials. Once logged in, the user may then send a command to the authentication server. The command serves as the request to access one or more services provided by a service provider. As such, as described herein, the authentication server receives the indication of the request.

In another embodiment, a previously created account, that includes the confirmed mobile number of the user can be automatically detected, with access authorized, on opening or launching of a mobile app or a mobile website. Access is authorized by detection of the mobile number, which is matched against a list of previously registered users. The previous registration of users to create accounts can occur in any environment, including on mobile, on another device such as a laptop, over the phone, or in person. For example, E-commerce sites have a database of existing users, but when a user clicks a link or an ad on their phone and lands on the retailer's mobile site, they are not logged in. The user is then faced with having to remember the email address and password they originally signed up with, or going through a password reset process. The friction this introduces prevents many users from converting, resulting in lost transactions. Average cart abandonment rates in mobile retail are 86%. In addition, the site loses the opportunity to re-target the user across other channels such as email. According to example embodiments of the system, an e-commerce site can detect the user's phone number, then instantly find the user's existing account by matching on the phone number. The user is then automatically logged in without having to take any action. This enables the user to seamlessly enter a logged-in experience, which increases the probability of the transaction being completed. This extends the persistent logged in concept from native apps to mobile websites without the need for a cookie. The value to the e-commerce site is an increase in conversion rates on the mobile site.

In the instance of a mobile app, when a user downloads an app, the app wants the user to create an account before they start using it, so the app can track the user's activity, persist their login on new devices, and possibly contact them. Existing account creation methods fall into two categories: 1) Ask for an email address and password, or 2) use a federated login service. The first introduces significant friction into the process and requires the user to give an email address, which they may not want to do for fear of spam. The second introduces less, but still some, friction in which the user has to switch over to the app provided the federated identity solution, log in, and then switch back. The second also comes with user concerns about privacy. Using the above-mentioned authentication processes, the app may detect the user's phone number, then instantly and automatically create an account tied to the phone number. This significantly reduces the friction of signing up for an account, getting users more quickly into the experience of using the app and eliminating user privacy concerns of using federated login services. Prompting the user for other data such as an email address can be pushed later into the experience when the user has become engaged in the app experience.

Operation

FIGS. 3-10 show data flows or flowcharts (hereinafter, flowcharts) of the exemplary operations performed by a method, apparatus and computer program product in accordance with embodiments of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present invention and executed by a processor 202 in the apparatus 200. As will be appreciated, any such computer program instructions may be loaded onto a computer or other programmable apparatus (for example, hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 3-10 when executed, convert a computer or processing circuitry into a particular machine configured to perform an example embodiment of the present invention. Accordingly, the operations of FIGS. 3-10 define an algorithm for configuring a computer or processing to perform an example embodiment. In some cases, a general purpose computer may be provided with an instance of the processor which performs the algorithms of FIGS. 3-10 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be unnecessary, modified or further amplified. It should be appreciated that each of the modifications, optional operations or amplifications may be included with the operations either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
    receive, from a service provider, a request for a session id, the request for the session id being indicative of an attempt to access one or more services provided by the service provider by a mobile device;
    generate the session id;
    provide the session id to the service provider;
    receive, from the mobile device, identification information associated with the mobile device, wherein the identification information comprises the session id and account information provided by a telecommunications carrier associated with the mobile device;
    compute an encrypted hash of the identification information associated with the mobile device;
    initiate a search of a registry for a matching entry that matches the encrypted hash of the identification information associated with the mobile device, wherein the registry comprises a plurality of entries comprising an encrypted hash of a registered account and data associated with a user of the registered account;
    in an instance when an entry matches the encrypted hash of the identification information, prompt the service provider to grant the mobile device access to one or more services provided by the service provider;
    access authentication history of the mobile device;
    determine if the service provider allows for access to the one or more services without the account information provided by the telecommunications carrier associated with the mobile device;
    when the service provider allows for access to the one or more services without the account information provided by the telecommunications carrier associated with the mobile device, determine whether the mobile device was previously successfully authenticated within a predetermined period of time; and
    when it is determined that the mobile device was previously successfully authenticated within the predetermined period of time, prompt the service provider to grant the mobile device access to one or more services provided by the service provider.

2. The apparatus according to claim 1, wherein the account information provided by the telecommunications carrier is a telephone number.

3. The apparatus according to claim 1, wherein the identification information further comprises biometric information of the user of the mobile device.

4. The apparatus according to claim 1, wherein the identification information is embedded in an hypertext transfer protocol (HTTP) or hypertext transfer protocol secure (HTTPS) request transmitted from the mobile device by way of the telecommunications carrier associated with the mobile device.

5. The apparatus according to claim 1, wherein the at least one memory and the computer program code are further configured to, with the processor, cause the apparatus to:
    prompt the service provider to grant the mobile device access to the one or more services provided by the service provider over an out-of-band channel.

6. The apparatus according to claim 1, wherein the at least one memory and the computer program code are further configured to, with the processor, cause the apparatus to: digitally sign a message comprising the identification information associated with the mobile device using a private key associated with the user of the mobile device.

7. A method comprising:
receiving, from a service provider, a request for a session id;
generating the session id;
providing the session id to the service provider;
receiving, from a mobile device, identification information associated with the mobile device, wherein the identification information comprises the session id and account information provided by a telecommunications carrier associated with the mobile device;
computing an encrypted hash of the identification information associated with the mobile device;
transmitting the encrypted hash of the identification information to the service provider, wherein the encrypted hash of the identification information is utilized to establish a registered account associated with the identification information, wherein the registered account is operable to access one or more services provided by the service provider;
accessing authentication history of the mobile device;
determining if the service provider allows for access to the one or more services without the account information provided by the telecommunications carrier associated with the mobile device;
when the service provider allows for access to the one or more services without the account information provided by the telecommunications carrier associated with the mobile device, determining whether the mobile device was previously successfully authenticated within a predetermined period of time; and
when it is determined that the mobile device was previously successfully authenticated within the predetermined period of time, prompting the service provider to grant the mobile device access to one or more services provided by the service provider.

8. The method according to claim 7, wherein the registered account is established without setting up a username and password.

9. An apparatus comprising at least one processor and at least one memory including computer program code, the at least one memory and the computer program code configured to, with the processor, cause the apparatus to at least:
receive, from a service provider, a request for a session id;
generate the session id;
provide the session id to the service provider;
receive, from a mobile device, identification information associated with the mobile device, wherein the identification information comprises the session id and account information provided by a telecommunications carrier associated with the mobile device;
compute an encrypted hash of the identification information associated with the mobile device;
transmit the encrypted hash of the identification information to the service provider, wherein the encrypted hash of the identification information is utilized to establish a registered account associated with the identification information, wherein the registered account is operable to access one or more services provided by the service provider;
access authentication history of the mobile device;
determine if the service provider allows for access to the one or more services without the account information provided by the telecommunications carrier associated with the mobile device;
when the service provider allows for access to the one or more services without the account information provided by the telecommunications carrier associated with the mobile device, determine whether the mobile device was previously successfully authenticated within a predetermined period of time; and
when it is determined that the mobile device was previously successfully authenticated within the predetermined period of time, prompt the service provider to grant the mobile device access to one or more services provided by the service provider.

10. The apparatus according to claim 9, wherein the registered account is established without setting up a username and password.

11. A computer program product comprising at least one non-transitory computer-readable storage medium having computer-executable program code instructions stored therein, the computer-executable program code instructions comprising program code instructions for:
receiving, from a service provider, a request for a session id;
generating the session id;
providing the session id to the service provider;
receiving, from a mobile device, identification information associated with the mobile device, wherein the identification information comprises the session id and account information provided by a telecommunications carrier associated with the mobile device;
computing an encrypted hash of the identification information associated with the mobile device;
transmitting the encrypted hash of the identification information to the service provider, wherein the encrypted hash of the identification information is utilized to establish a registered account associated with the identification information, wherein the registered account is operable to access one or more services provided by the service provider;
accessing authentication history of the mobile device;
determining if the service provider allows for access to the one or more services without the account information provided by the telecommunications carrier associated with the mobile device;
when the service provider allows for access to the one or more services without the account information provided by the telecommunications carrier associated with the mobile device, determining whether the mobile device was previously successfully authenticated within a predetermined period of time; and
when it is determined that the mobile device was previously successfully authenticated within the predetermined period of time, prompting the service provider to grant the mobile device access to one or more services provided by the service provider.

12. The computer program product according to claim 11, wherein the registered account is established without setting up a username and password.

* * * * *